(12) United States Patent
Ishikawa et al.

(10) Patent No.: US 12,347,118 B2
(45) Date of Patent: Jul. 1, 2025

(54) INFORMATION PROCESSING APPARATUS, INFORMATION PROCESSING METHOD, AND NON-TRANSITORY STORAGE MEDIUM FOR PROCESSING IMAGE FEATURES OF ANATOMICAL PARTS FROM EXAMINATION IMAGES OF A SUBJECT

(71) Applicant: CANON KABUSHIKI KAISHA, Tokyo (JP)

(72) Inventors: Ryo Ishikawa, Kanagawa (JP); Toru Tanaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 611 days.

(21) Appl. No.: 17/560,682

(22) Filed: Dec. 23, 2021

(65) Prior Publication Data

US 2022/0230328 A1 Jul. 21, 2022

(30) Foreign Application Priority Data

Jan. 15, 2021 (JP) ................................. 2021-005290

(51) Int. Cl.
*G06T 7/246* (2017.01)
*G06T 7/00* (2017.01)
*G06T 7/149* (2017.01)

(52) U.S. Cl.
CPC ............ *G06T 7/246* (2017.01); *G06T 7/0012* (2013.01); *G06T 7/149* (2017.01);
(Continued)

(58) Field of Classification Search
CPC .......... G06T 2207/30048; G06T 2207/30096; G06T 2207/30061; G06T 7/10; G06V 10/40; G06V 2201/03; G06V 2201/031
See application file for complete search history.

(56) References Cited

U.S. PATENT DOCUMENTS 9,704,294 B2    7/2017   Ishida et al.
9,953,423 B2    4/2018   Miyasa et al.
(Continued)

FOREIGN PATENT DOCUMENTS

JP    2016-067832 A    5/2016
JP    2019-180899 A    10/2019
(Continued)

OTHER PUBLICATIONS

Notice of Reasons for Refusal issued by the Japanese Patent Office on Aug. 16, 2024 in corresponding JP Patent Application No. 2021-005290, with English translation.

*Primary Examiner* — Guillermo M Rivera-Martinez
(74) *Attorney, Agent, or Firm* — Carter, DeLuca & Farrell LLP

(57) ABSTRACT

An information processing apparatus comprising: an extraction unit configured to extract a predetermined region of an anatomical part from an examination image of a subject; a first feature amount acquisition unit configured to acquire a first feature amount of the predetermined region related to a movement of the anatomical part; a second feature amount acquisition unit configured to acquire a second feature amount of the predetermined region related to the movement; a division unit configured to divide the predetermined region; and an integration unit configured to integrate the first feature amount and the second feature amount based on a result of division by the division unit.

20 Claims, 8 Drawing Sheets

(52) U.S. Cl.
CPC ............... *G06T 2207/20116* (2013.01); *G06T 2207/30048* (2013.01); *G06T 2207/30061* (2013.01); *G06T 2207/30096* (2013.01)

(56) References Cited

U.S. PATENT DOCUMENTS

| | | | |
|---|---|---|---|
| 10,019,811 B2 | 7/2018 | Endo et al. | |
| 10,268,918 B2 | 4/2019 | Otomaru et al. | |
| 2010/0074490 A1* | 3/2010 | Arakita | G06T 7/20 382/128 |
| 2011/0019878 A1* | 1/2011 | Soubelet | G06T 7/246 382/128 |
| 2011/0280461 A1* | 11/2011 | Bystrov | G06T 7/246 382/131 |
| 2012/0250966 A1* | 10/2012 | Fujisawa | G06T 7/0016 382/131 |
| 2013/0222368 A1 | 8/2013 | Takama et al. | |
| 2015/0005659 A1* | 1/2015 | Masumoto | A61B 6/032 600/538 |
| 2015/0065817 A1* | 3/2015 | Noji | A61B 6/5264 600/407 |
| 2016/0098836 A1* | 4/2016 | Yamato | G06T 7/20 382/128 |
| 2016/0256127 A1* | 9/2016 | Lee | A61B 6/5264 |
| 2017/0287114 A1* | 10/2017 | Futamura | A61B 6/541 |
| 2017/0309026 A1* | 10/2017 | Sakamoto | G06T 7/0016 |
| 2018/0137634 A1* | 5/2018 | Fujiwara | G06T 7/0012 |
| 2018/0253855 A1* | 9/2018 | Koizumi | G06T 7/246 |
| 2019/0096118 A1* | 3/2019 | Weber | G06T 15/08 |
| 2019/0287248 A1* | 9/2019 | Abe | G06T 7/11 |
| 2019/0343482 A1* | 11/2019 | Abe | A61B 8/5284 |
| 2020/0327665 A1* | 10/2020 | Shimamura | A61B 6/541 |
| 2021/0052228 A1* | 2/2021 | Abe | A61B 5/004 |

FOREIGN PATENT DOCUMENTS

| | | |
|---|---|---|
| JP | 2020-171476 A * | 10/2020 |
| WO | 2011/055742 A1 | 5/2011 |

* cited by examiner

INFORMATION PROCESSING APPARATUS, INFORMATION PROCESSING METHOD, AND NON-TRANSITORY STORAGE MEDIUM FOR PROCESSING IMAGE FEATURES OF ANATOMICAL PARTS FROM EXAMINATION IMAGES OF A SUBJECT

BACKGROUND OF THE INVENTION

Field of the Invention

The present invention relates to an information processing apparatus, an information processing method, and a non-transitory storage medium.

Description of the Related Art

On medical sites, images of patients are captured using medical imaging apparatuses such as X-ray CT apparatuses and PET apparatuses. Here, CT is an abbreviation for Computed Tomography, and PET is an abbreviation for Positron Emission Tomography. Then, by observing the captured medical images in detail, anatomical structures and functional information of various kinds of organs (anatomical parts) of a patient are obtained, and that information is utilized for diagnosis and treatment.

Among the various types of organs that constitute the human body are types of organs that move with respect to the surrounding organs. For example, the lungs are moved by respiratory movement, and the heart moves to circulate blood throughout the body. Also, it is known that, even in the same organ, motion (direction and amount of movement) differs depending on the position inside or on the surface of the organ (hereinafter, referred to as intra-organ position) due to the structure of the organ, presence or absence of a lesion, and the like. Here, a user (physician, etc.) wishes to discover dysfunction and lesions by visualizing, from a medical image, a difference in the direction or amount of movement (hereinafter, movement information) (i.e., visualizing the distribution of direction or amount of movement) depending on the intra-organ position of the target organ and then recognizing an intra-organ position at which motion is abnormal. For example, there is a wish to identify, from a medical image, an adhesion position on the surface of the lungs by visualizing a difference in information on movement caused by respiratory movement of the lungs due to a difference in the position on the surface of the lungs.

Japanese Patent Laid-Open No. 2016-67832 discloses a technique for calculating an amount of slip at a surface position caused by respiratory movement, which is deeply related to adhesion at the surface of the lungs.

However, in the prior art, there is a problem that it is difficult to acquire features for each region in an anatomical part (e.g., lungs) of a subject (e.g., human body) using a method that is suitable for that region.

The present invention is made in view of the above problem and provides a technique for acquiring features using a method that is suitable for each region in an anatomical part of a subject.

SUMMARY OF THE INVENTION

According to one aspect of the present invention, there is provided an information processing apparatus comprising: an extraction unit configured to extract a predetermined region of an anatomical part from an examination image of a subject; a first feature amount acquisition unit configured to acquire a first feature amount of the predetermined region related to a movement of the anatomical part; a second feature amount acquisition unit configured to acquire a second feature amount of the predetermined region related to the movement; a division unit configured to divide the predetermined region; and an integration unit configured to integrate the first feature amount and the second feature amount based on a result of division by the division unit.

Further features of the present invention will become apparent from the following description of exemplary embodiments (with reference to the attached drawings).

DESCRIPTION OF THE EMBODIMENTS

Figure 1:
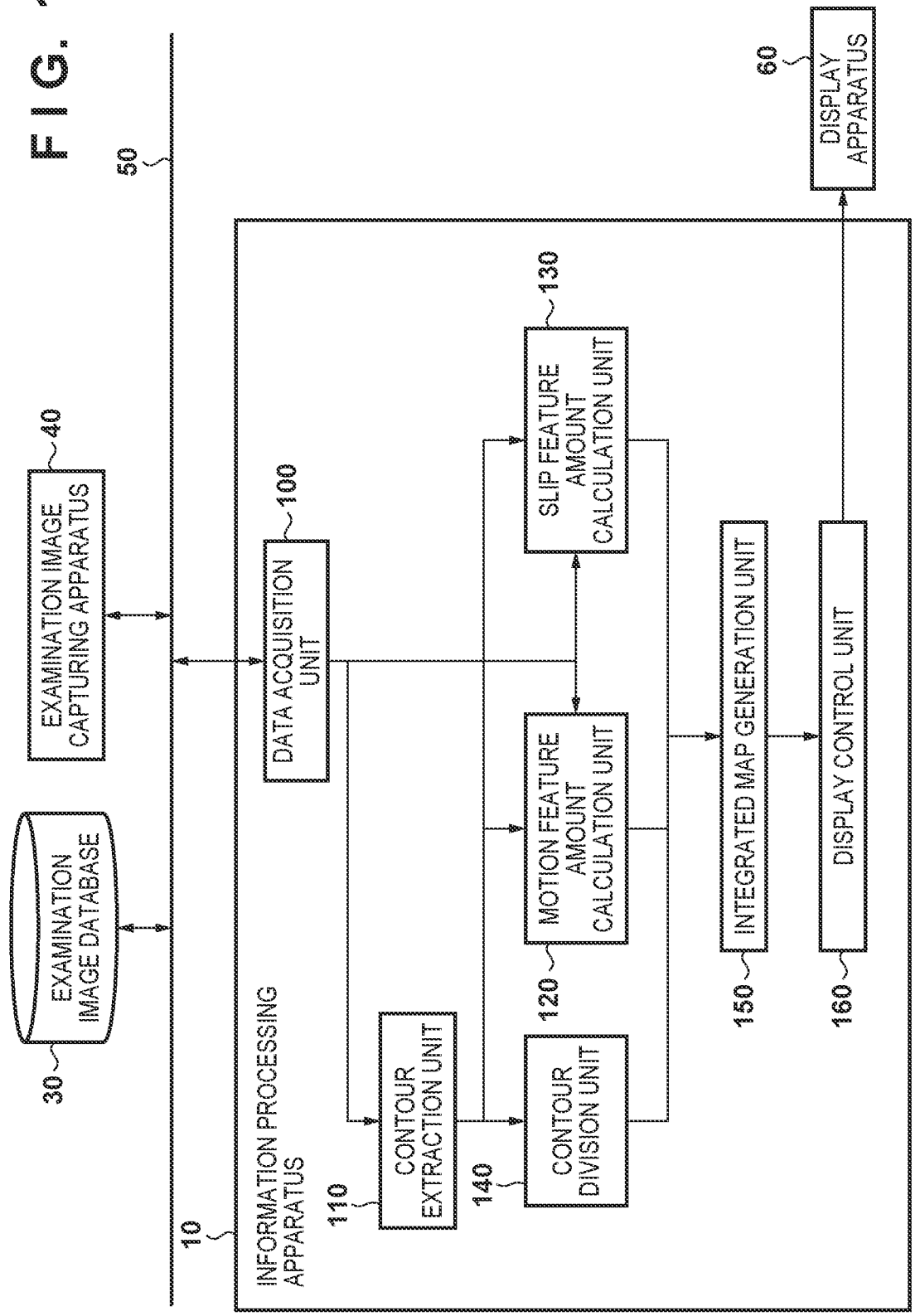
FIG. 1 is a diagram illustrating an example of a device configuration of an information processing system according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

An information processing system according to the first embodiment of the present invention provides, to a user, such as a doctor or technician in a medical institution, a function for recognizing an adhesion state of the pleurae of a subject (patient), who is an examination target, and supporting diagnosis. More specifically, the state of movement of the lungs is acquired by analyzing a three-dimensional motion image in which the subject's lungs are captured, and then the feature amount thereof is calculated. A function for then generating, based on this, an observation image, which the user can easily view, is provided. Note that the information processing system according to the present embodiment calculates a feature amount relating to slip, which is calculated from a relative movement amount between the lungs and surrounding parts of the subject, and a feature amount relating to motion, which is calculated from an absolute movement amount of the lungs. Then, an observation image in which these feature amounts have been integrated based on the part of the lungs is generated.

<Configuration of Information Processing System>

FIG. 1 is a diagram illustrating an overall configuration of the information processing system according to the first embodiment. The information processing system includes an information processing apparatus 10, an examination image database 30, an examination image capturing apparatus 40, and a display apparatus 60, and these apparatuses are connected so as to be able to communicate with each other via a communication unit. In the present embodiment, the communication unit is configured by a LAN (Local Area Network) 50 but may be a WAN (Wide Area Network). The connection method of the communication unit may be wired or wireless connection.

The examination image database 30 holds a plurality of examination images related to a plurality of patients and additional information thereof. The examination images are, for example, medical images captured using diagnostic imaging apparatuses such as CT and MRI apparatuses and include two-dimensional images, three-dimensional images, and four-dimensional images, which are three-dimensional motion images. Here, CT is an abbreviation for Computed Tomography, and MRI is an abbreviation for Magnetic Resonance Imaging.

Images in various forms, such as monochrome or color, are also included. The examination image database 30 in the present embodiment holds four-dimensional CT (4D-CT) data of the subject. The examination image database 30 holds, as additional information of an examination image, a patient name (patient ID), examination day information (the date on which the examination image was captured), imaging modality name of examination image, and the like. Further, in order to distinguish each of the examination images and its additional information from others, they are assigned a unique number (examination image ID), and based on that, the information processing apparatus 10 can read out information.

The examination image database 30 also holds a map of a standard motion amount and standard slip amount (specific examples of motion amount and slip amount will be described in detail later) of the pleurae in a normal case. Here, the normal case is the case where there is no adhesion in the pleurae.

<Function Configuration of Information Processing Apparatus>

The information processing apparatus 10 acquires information held by the examination image database 30 via the LAN 50. The information processing apparatus 10 includes a contour extraction unit 110, a motion feature amount calculation unit 120, a slip feature amount calculation unit 130, a contour division unit 140, an integrated map generation unit 150, and a display control unit 160.

A data acquisition unit 100 acquires an examination image of a subject that the examination image capturing apparatus 40 captured and the examination image database 30 holds and a map of the standard motion amount and standard slip amount (to be described in detail later) of the pleurae in the normal case.

The contour extraction unit 110 extracts a contour of the lungs from the examination image of the subject. The motion feature amount calculation unit 120 analyzes the examination image that the data acquisition unit 100 acquired and calculates a map of a motion amount of the pleurae in the contour that the contour extraction unit 110 extracted. The slip feature amount calculation unit 130 analyzes the examination image that the data acquisition unit 100 acquired and calculates a map of a slip amount of the pleurae in the contour that the contour extraction unit 110 extracted.

The contour division unit 140 divides the contour that the contour extraction unit 110 extracted into a thoracic contour and a mediastinal contour. The integrated map generation unit 150 generates an integrated map in which the map of the motion amount that the motion feature amount calculation unit 120 calculated and the map of the slip amount that the slip feature amount calculation unit 130 calculated are integrated based on a result of contour division by the contour division unit 140. The display control unit 160 performs control for displaying, on the display apparatus 60, the integrated map (integration result) that the integrated map generation unit 150 generated.

Note that the configuration of the information processing system illustrated in FIG. 1 is merely an example. For example, the information processing apparatus 10 may have a storage unit (not illustrated) and therefore have a function of the examination image database 30. Further, the information processing apparatus 10 may be configured to include the display apparatus 60.

<Hardware Configuration of Information Processing Apparatus>

Next, a hardware configuration of the information processing apparatus 10 will be described with reference to FIG. 10. The information processing apparatus 10 includes a CPU 511, a ROM 512, a RAM 513, an auxiliary storage apparatus 514, an operation unit 515, a communication I/F 516, and a bus 517.

The CPU 511 realizes the functions of the information processing apparatus 10 illustrated in FIG. 1 by controlling the entire information processing apparatus 10 using a computer program or data stored in the ROM 512 or the RAM 513. Note that the information processing apparatus 10 may have one or more pieces of dedicated hardware that is different from the CPU 511, and at least a part of the processing by the CPU 511 may be executed by the dedicated hardware. Examples of dedicated hardware include an ASIC (Application Specific Integrated Circuit), an FPGA (Field Programmable Gate Array), and a DSP (Digital Signal Processor). The ROM 512 stores programs that do not need to be changed and the like. The RAM 513 temporarily stores programs and data supplied from the auxiliary storage apparatus 514, data supplied from an external unit via the communication I/F 516, and the like. The auxiliary storage apparatus 514 is configured by, for example, a hard disk drive and stores various kinds of data such as image data and voice data.

The operation unit 515 is configured by, for example, a keyboard, a mouse, a joystick, and a touch panel, and inputs various instructions to the CPU 511 in response to operations by the user.

The communication I/F 516 is used for communicating with an apparatus that is external to the information processing apparatus 10. For example, when the information processing apparatus 10 is connected with an external apparatus by wire, a cable for communication is connected to the communication I/F 516. When the information processing apparatus 10 has a function of wirelessly communicating with an external apparatus, the communication I/F 516 includes an antenna. The bus 517 communicates information by connecting the respective units of the information processing apparatus 10.

In the present embodiment, the operation unit 515 is assumed to exist inside the information processing apparatus 10 but may exist outside the information processing apparatus 10 as another apparatus. In such a case, the CPU 511 may operate as an operation control unit for controlling the operation unit 515.

<Processing>

Figure 2:
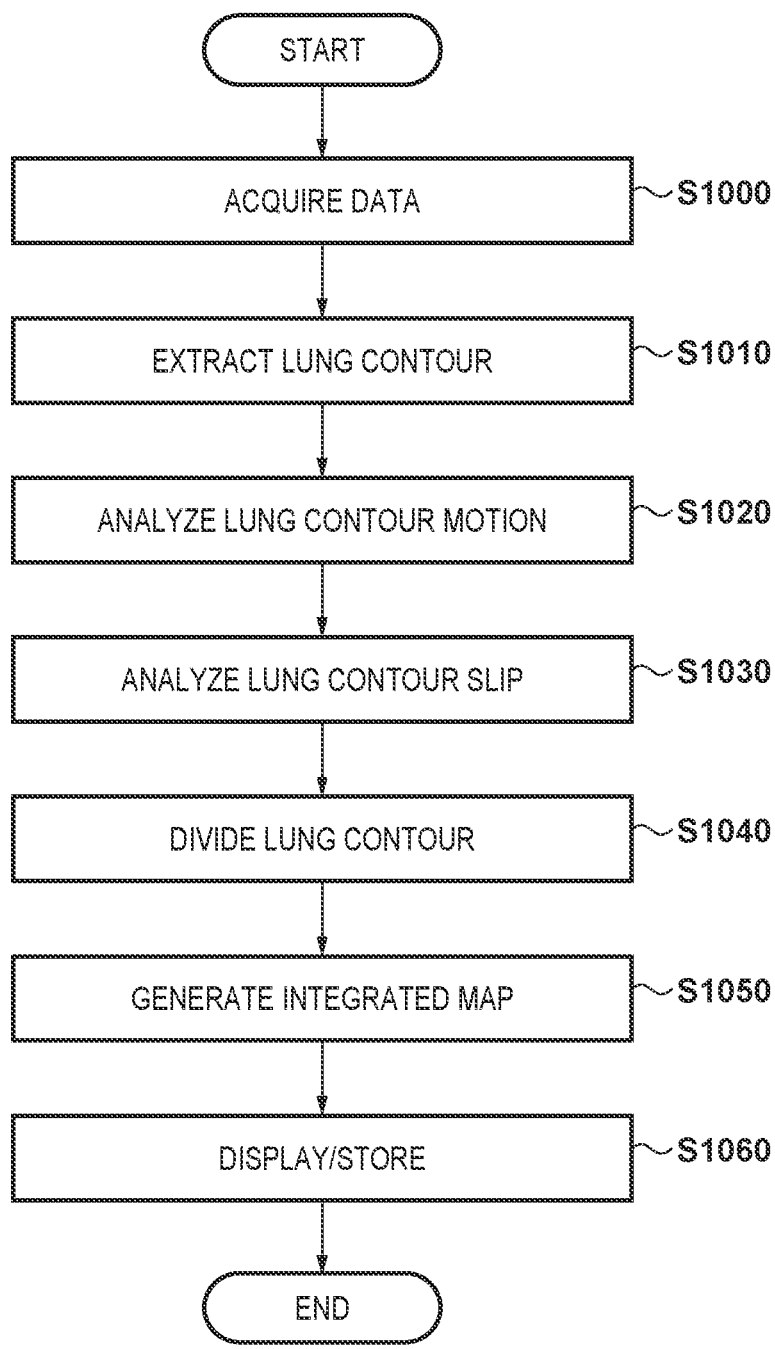
FIG. 2 is a flowchart illustrating the entire processing procedure in the first embodiment.

Next, the entire processing procedure by the information processing apparatus 10 in the present embodiment will be described in detail with reference to FIG. 2. Further, in the following, description will be given using, as an example, a case where CT data is used as an examination image, but the implementations of the present invention are not limited thereto. For example, the data may be an MRI image or ultrasonic image as long as the data is three-dimensional time-series volume data in which the lungs are captured.

(Step S1000: Acquiring Data)

In step S1000, the data acquisition unit 100 acquires, from the examination image database 30, 4D-CT data in which a lung field of a subject is captured. The 4D-CT data in the present embodiment is three-dimensional time-series volume data and is data in which movement caused by the subject breathing is captured. More specifically, 4D-CT data consisting of 3D-CT data at two points in time, an inhalation position (e.g., the maximal inhalation position) and an exhalation position (e.g., the maximal exhalation position) of the subject, is acquired. In the present embodiment, 3D-CT data at an inhalation position is expressed as I_ins, and 3D-CT data at an exhalation position is expressed as I_exp. Also, 4D-CT data containing these are expressed as I. It is assumed that the entirety of the lungs of the subject are captured in these 3D-CT data in the present embodiment.

Note that, in the present embodiment, description will be given using, as an example, a case where 3D-CT data at two points in time, an inhalation position and an exhalation position, are used as described above; however, the present invention is not limited thereto. So long as the movement of the lung field caused by the subject breathing can be captured, 3D-CT data at other two points of respiratory condition may be used. For example, an image of an inhalation position and an image of a time phase adjacent thereto may be used. In addition, the present invention is not limited to the case where images of two time phases are used and may acquire an image at three time phases or more. In the case where movement is evaluated by acquiring an image at three or more time phases, a movement amount and slip amount to be described later may be evaluated by selecting, from among the time phases, a plurality of pairs of time points, and then use statistics (average value, median, maximum value, etc.) of the movement amount and slip amount obtained from each pair, for example.

Further, the data acquisition unit 100 acquires, from the examination image database 30, each of the standard motion amount map, which is the standard motion amount of the pleurae in the normal case where there is no adhesion in the pleurae, and the standard slip amount map, which is the standard slip amount in the same case. In the present embodiment, it is assumed that the standard motion amount map and standard slip amount map are acquired as volume data discretized to the same extent as 3D-CT data of the subject. In this embodiment, the standard motion amount map is expressed as Rm(x), and the standard slip amount map is expressed as Rs(x). Rm(x) and Rs(x) are each a function that takes a coordinate value x representing a position in the map as an argument and returns the standard motion amount and standard slip amount for that position.

(Step S1010: Extracting Lung Contour)

In step S1010, the contour extraction unit 110 analyzes the 3D-CT data I_ins at an inhalation position of the subject acquired in step S1000 and executes a process of extracting a contour of the lungs. This processing can be performed by a segmentation technique that is known as processing for medical images. As a result of this processing step, the contour extraction unit 110 acquires a lung contour mask L(x). Here, the lung contour mask L(x) is a function that takes the coordinate value x representing a position in the 3D-CT data I_ins as an argument and returns 1 if the position is a lung contour and 0 otherwise.

(Step S1020: Analyzing Lung Contour Motion)

Figure 3:
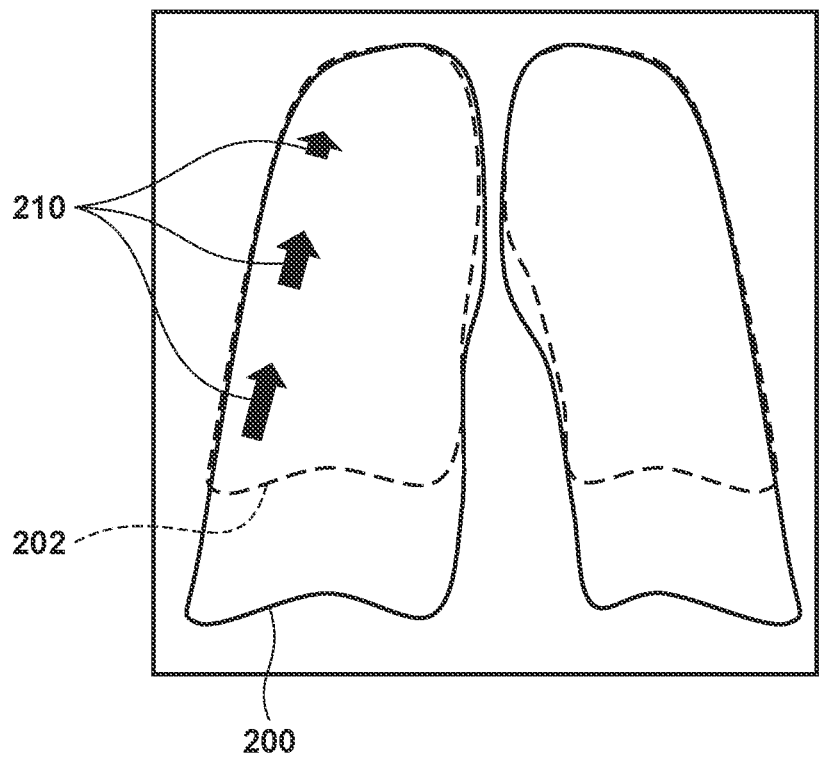
FIG. 3 is a diagram for explaining the process of step S1020 in the first embodiment in detail.

In step S1020, the motion feature amount calculation unit 120 analyzes the movement of the subject's lungs by processing the 4D-CT data I and calculates and acquires a feature amount of motion in the contour portion of the lungs caused by breathing (acquires a first feature amount). In the present embodiment, description will be given using, as an example, a case where a motion feature amount relating to the subject's right lung is calculated. However, the present invention is not limited to this and may target the left or both left and right lungs. The movement (motion) of the lung caused by breathing will be described with reference to FIG. 3. FIG. 3 is a view illustrating a coronal plane of the lungs at an inhalation position and an exhalation position. Reference numeral 200 in the same figure represents a contour shape of the lung in an inhalation position. Also, reference numeral 202 is the contour shape of the lung in an exhalation position. In this way, the contour shapes of the lung are different between the inhalation position and the exhalation position. Arrows 210 in the figure represent the movement (motion) of the lung from the inhalation position to the exhalation position caused by breathing at each position of the lung contour. In this processing step, a motion feature amount at each position of the lung contour is calculated as a feature amount representing this movement (motion) of the lung at each position of the lung contour.

Figure 4:
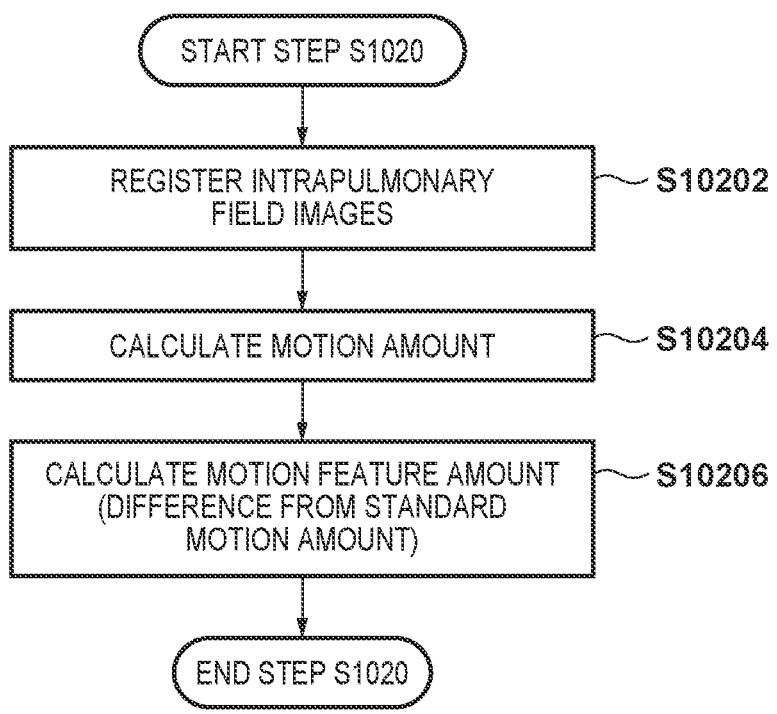
FIG. 4 is a flowchart illustrating the processing procedure of step S1020 in the first embodiment.

Here, the detailed processing procedure of the present processing step will be described in more detail with reference to the flowchart of FIG. 4.

(Step S10202: Registering Intrapulmonary Field Images)

In step S10202, the motion feature amount calculation unit 120 executes a process of registering positions in the lung field between the inhalation image I_ins and the exhalation image I_exp acquired in step S1000. Thus, a displacement vector field V1(x) for each position in the inhalation image I_ins to a corresponding position in the exhalation image I_exp is acquired. More specifically, registration is performed to capture the movement of each position that occurs in the subject's lung field during a period from inhalation to exhalation. While this registration process may be performed by any known process for registering images, it is desirable to perform a deformation registration that captures deformation of the target.

Further, in order to more accurately capture the movement in the lung field of the subject, image features in the lung field may be emphasized, or conversely, an image in which image features outside the lung field is attenuated may be generated, and registration may be performed using that image. For example, an image in which values of voxels outside the lung field are masked may be generated based on the lung contour mask L(x) extracted in step S1010 and used for registration. Alternatively, an image on which window transformation (voxel value transformation that saturates what is outside the scope of a predetermined voxel value) has been performed based on the distribution of voxel values inside and outside the lung field so that the distribution of voxel values in the lung field is emphasized may be generated, and that image may be used for registration.

By the registration processing described above, the intrapulmonary field displacement vector field V1($x$) for each position in the inhalation image I_ins to a corresponding position in the exhalation image I_exp is acquired. Here, V1($x$) is a function that takes the coordinate value x on the inhalation image as an argument and returns a three-dimensional vector representing a displacement of each position of the subject's lung from the inhalation position to the exhalation position. More specifically, V1($x$) is volume data holding the respective displacements of the respective axes at each position which has been discretized to the same extent as 3D-CT data.

Note that in the above description, description has been given using, as an example, a case where an image at an inhalation position and an image at an exhalation position are used as a target of deformation registration; however the present invention is not limited to this, and images at any time phase may be used so long as the movement at each position of the lung field due to breathing can be acquired. For example, an image of an inhalation position and an image of a time phase adjacent thereto may be used. Alternatively, configuration may be taken so as to acquire images at three or more time phases in step S1000, register the images in a daisy chain, and then acquire the movement at each position of the lung field caused by breathing. This is the same in the registration that is performed as the process in step S1030 to be described later.

(Step S10204: Calculating Motion Amount)

In step S10204, the motion feature amount calculation unit 120 executes a process of calculating a motion amount (scalar value) on the lung contour based on the displacement vector field V1($x$) calculated in step S10202 and the lung contour L(x) calculated in step S1010. Specifically, the motion feature amount calculation unit 120 calculates a norm of V1($x$) as the motion amount. In this embodiment, description will be given using, as an example, a case where the motion amount is calculated using predetermined intervals (e.g., 1 mm) over the entire contour of the subject's lung.

In the present embodiment, a position on the contour on which to calculate the motion amount will be denoted as P1_i ($1 \leq i \leq N$) and the calculated motion amount will be denoted as M_i ($1 \leq i \leq N$). Here, i is an index for distinguishing a plurality of positions on a contour, and N is the total number of positions on the contour. In this embodiment, N units of motion amount M_i are held as a motion amount map M(x). The motion amount map M(x) is a function that takes a position x in an image coordinate system of 3D-CT data at an inhalation position as an argument and returns the motion amount at that position. More specifically, N units of motion amount M_i are held as volume data which has been discretized to the same extent as 3D-CT data. Note that, in a case where the motion amount map M(x) takes a position other than the contour as an argument, the motion amount map M(x) returns an invalid value (for example, an identifiable value such as a negative value).

(Step S10206: Calculating Motion Feature Amount (Difference from Standard Motion Amount))

In step S10206, the motion feature amount calculation unit 120 calculates, as information representing a difference (degree of deviation) between the motion amount at each position of the lung contour calculated in step S10204 and the standard motion amount at each position, the motion feature amount at each position of the lung contour. In the present embodiment, the motion feature amount is held as a motion feature amount map M'(x). Specifically, calculation can be performed as, for example, M'(x)=M(x)/Rm(d(x)). Here, d(x) is a displacement function that corrects the relationship of the positions between the standard motion amount map Rm(x) and the motion amount map M(x). Specifically, it is a correction function which causes the lung contour, lung apex position, lung base position, and the like to coincide between both maps, d(x) can be obtained by, for example, using any nonlinear registration that uses rigid body registration, affine registration, FFE(Free Form Deformation), and the like, which take, as a cost function, the difference between the shapes of the lung contours and minimize the difference. Thus, the motion feature amount map M'(x) representing the relative relationship between the amount of motion of the subject's lung and the standard amount of motion in a normal case where there is no adhesion in the pleura is calculated.

In the above description, the case where the motion feature amount map M'(x) is calculated using the ratio between the motion amount map M(x) and the standard motion amount map Rm(x) has been described as an example, but the present invention is not limited thereto. For example, the motion feature amount map may be calculated as the difference calculation between the motion amount map M(x) and the standard motion amount map Rm(x):M'(x)=M(x)−Rm(d(x)). That is, any method may be used for calculation so long as the method can quantify the difference (degree of deviation) of a motion amount at a certain position from the standard motion amount at that position. In addition, the motion amount itself may be used as the motion feature amount rather than the difference (degree of deviation) from the standard motion amount. That is, it may be M'(x)=M(x). In this case, the process of acquiring the standard motion amount map Rm(x) in step S1000 is not necessary.

Through the above processing, the motion feature amount at each position of the contour of the subject's lung at an inhalation position is calculated. Generally, in the case of a subject with pleura adhesion, there is a tendency that the motion feature amount decreases at the adhesion point. Incidentally, the process of calculating motion feature amount using the above method can be performed in a stable manner even if the image features outside the lung field of the subject (e.g., voxel value patterns on the edges, in the corners, and the like) are lacking so long as image features are present inside the lung field. Therefore, in the vicinity of the contour of the lung field adjacent to the mediastinal side where image features are relatively lacking, the feature amount in which presence/absence of adhesion is more accurately portrayed can be calculated in comparison to the later-described slip feature amount. Note that the calculation of the motion feature amount at each position of the contour of the lung is not limited to the above-described method and may be performed by an arbitrary method.

(Step S1030: Analyzing Lung Contour Slip)

Returning to FIG. 2, in step S1030, the slip feature amount calculation unit 130 analyzes the movement in the contour portion of the subject's lung by processing 4D-CT data I and calculates and obtains the slip amount caused by breathing (obtains a second feature amount). In the present embodiment, description will be given using, as an example, a case where the slip amount relating to the right lung of the subject is calculated. The amount of slip at the contour portion of the lung caused by breathing will be described with reference to FIG. 5.

Figure 5:
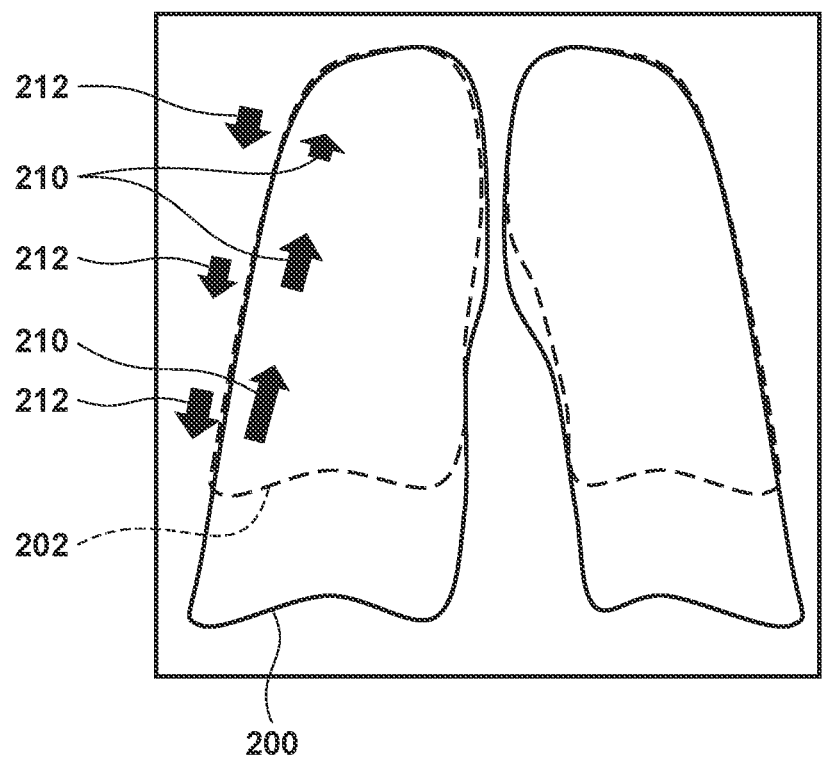
FIG. 5 is a diagram for explaining the process of step S1030 in the first embodiment in detail.

Similarly to FIG. 3, FIG. 5 is a view illustrating a coronal plane of the lungs at an inhalation position and an exhalation position of the lungs.

Similar to FIG. 3, reference numerals 200, 202, and 210 in the same figure represent the contour shapes of the lungs at an inhalation position, the contour shapes of the lungs of an exhalation position, and the movement of the lungs from the inhalation position to the exhalation position caused by breathing at each position of the lung contour, respectively. Arrows 212 represent the movement of the chest wall from the inhalation position to the exhalation position caused by breathing at each position of the lung contour. As indicated by the direction and size of the arrows 210 and 212 in the figure, movement involving slip occurs at each position of the lung contour, at positions of the pleurae between the lung-field side and the chest-wall side due to breathing.

In this processing step, a slip feature amount at each position of the contour is calculated as a feature amount representing the magnitude of slip at each position of this lung contour.

Figure 6:
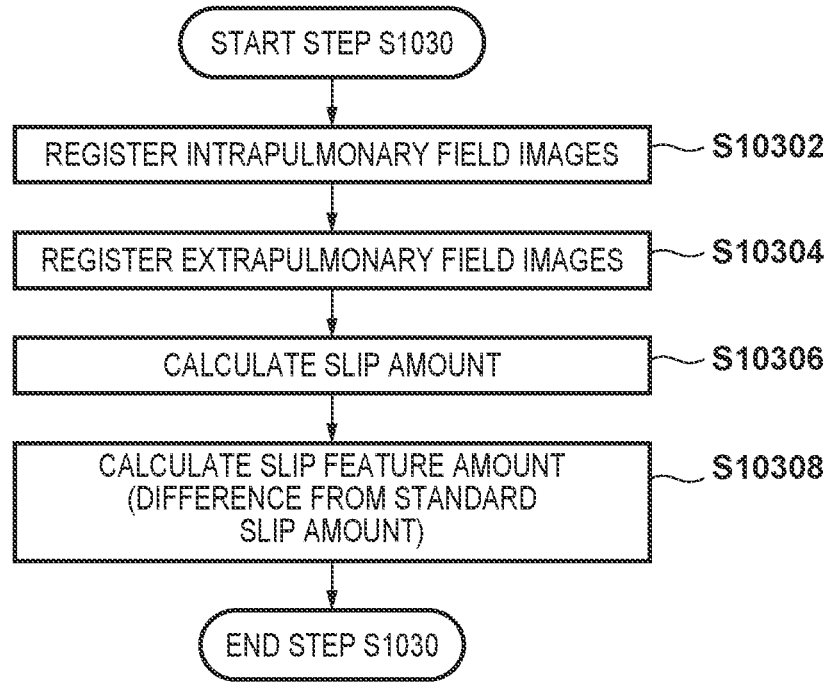
FIG. 6 is a flowchart illustrating the processing procedure of step S1030 in the first embodiment.

The detailed processing procedure of the present processing step will be described in more detail with reference to the flowchart of FIG. 6.

(Step S10302: Registering Intrapulmonary Field Images)

In step S10302, the slip feature amount calculation unit 130 executes a process of registering positions in the lung field between the inhalation image I_ins and the exhalation image I_exp acquired in step S1000. Thus, a displacement vector field $V21(x)$ for each position x in the inhalation image I_ins to a corresponding position in the exhalation image I_exp is acquired. This process is the same as the process in step S10202 described above, so a detailed description thereof will be omitted. In addition, instead of executing this processing step, configuration may be taken so as to obtain the processing result of step S10202 described above. That is, it may be $V21(x)=V1(x)$. Using the method described above, a displacement vector field $V21(x)$ for each position x in the inhalation image I_ins to a corresponding position in the exhalation image I_exp is acquired.

(Step S10304: Registering Extrapulmonary Field Images)

In step S10304, the slip feature amount calculation unit 130 executes a process of registering positions outside of the lung field between the inhalation image I_ins and the exhalation image I_exp acquired in step S1000. Thus, a displacement vector field $V22(x)$ for each position x in the inhalation image I_ins to a corresponding position in the exhalation image I_exp is acquired. More specifically, registration is performed to capture the movement of each position that occurs outside the subject's lung field during a period from inhalation to exhalation. While this registration process may be performed by any known process of registering images, it is desirable to perform deformation registration, which captures deformation of a target. Further, in order to more accurately capture the movement outside the lung field of the subject, image features outside the lung field may be emphasized, or conversely, an image in which image features inside the lung field are attenuated may be generated, and registration may be performed using that image. For example, an image in which values of voxels inside the lung field are masked may be generated based on the lung contour mask L(x) extracted in step S1010 and used for registration. Alternatively, an image on which window transformation has been performed based on the distribution of voxel values inside and outside the lung field so that the distribution of voxel values outside the lung field is emphasized may be generated and then used for registration.

By the registration processing described above, the extrapulmonary field displacement vector field $V22(x)$ for each position in the inhalation image I_ins to a corresponding position in the exhalation image I_exp is acquired. Here, $V22(x)$ is a function that takes the coordinate value x on the inhalation image as an argument and returns a three-dimensional vector representing the displacement of a position from inhalation to exhalation. More specifically, respective displacement of each axis is held as volume data which has been discretized to the same extent as 3D-CT data.

(Step S10306. Calculating Slip Amount)

In step S10306, the slip feature amount calculation unit 130 executes a process of calculating the slip amount on the lung contour based on the displacement vector fields $V21(x)$ and $V22(x)$ obtained in steps S10302 and S10304 and the lung contour L(x) calculated in step S1010. Here, the slip amount is specifically the norm of a difference vector $V21(x)-V22(x)$. In this embodiment, description will be given using, as an example, a case where the slip amount is calculated using predetermined intervals (e.g., 1 mm) over the entire contour of the lung of the subject.

In the present embodiment, a position on the contour on which to calculate the slip amount will be denoted as P2_i ($1 \le i \le N$) and the calculated slip amount will be denoted as S_i ($1 \le i \le N$). Here, i is an index that identifies a plurality of positions on the contour, and N is the total number of positions on the contour. In this embodiment, N units of slip amount S_i are held as a slip amount map S(x). The slip amount map S(x) is a function that takes a position x in an image coordinate system of 3D-CT data at an inhalation position as an argument and returns the slip amount at that position. More specifically, N units of slip amount S_i are held as volume data which has been discretized to the same extent as 3D-CT data. Incidentally, similarly to the motion amount map M(x), in a case where the slip amount map S(x) takes a position other than the contour as an argument, the slip amount map S(x) returns an invalid value (for example, an identifiable value such as a negative value).

(Step S10308: Calculating Slip Feature Amount (Difference from Standard Slip Amount))

In step S10308, the slip feature amount calculation unit 130 calculates the slip feature amount at each position of the lung contour as information representing a difference (degree of deviation) between the slip amount at each position of the lung contour calculated in step S10306 and the standard slip amount at each position. In the present embodiment, the slip feature amount is held as a slip feature amount map S'(x). Specifically, calculation can be performed as, for example, $S'(x)=S(x)/Rs(d(x))$. Here, d(x) is a correction function described in the process of step S10206. Thus, the slip feature amount map S'(x) representing the relative relationship between the slip amount of the subject's lung and the standard slip amount in a normal case where there is no adhesion in the pleura is calculated.

Note that the method for calculating the slip feature amount map S'(x) is not limited to the above method. For example, similarly to the method for calculating the motion feature amount map M'(x) described in step S10206, the slip feature amount map S'(x) may be calculated by calculating the difference between the slip amount map S(x) and the standard slip amount map Rs(x). That is, any method may be used for calculation so long as the method can quantify the difference (degree of deviation) of a slip amount at a certain position from the standard slip amount at that position. In addition, the slip amount itself may be used as the slip feature amount rather than the difference (degree of deviation) from the standard slip amount. That is, it may be S'(x)=S(x). In this case, the process of acquiring the standard slip amount map Rs(x) in step S1000 is not necessary.

The process in step S1030 is executed by the processes from steps S10302 to S10308 described above. By this, the slip feature amount at each position of the contour of the subject's lung at an inhalation position is calculated. Generally, in the case of a subject with pleura adhesion, there is a tendency that the slip feature amount decreases at the adhesion point. In addition, since the process for calculating the slip feature amount by the above-described method calculates the feature amount using the movement characteristics of both the inside and outside of the subject's lung field, the feature amount that captures the presence or absence of adhesion more accurately can be calculated as compared with the aforementioned motion feature amount. However, processing cannot be performed in a stable manner on parts outside the lung field where image features are lacking, therefore, in the vicinity of the contour of a lung field adjacent to the mediastinal side where image features are relatively lacking, the aforementioned motion feature amount is a feature amount that accurately captures the presence or absence of adhesion. Note that the calculation of the slip feature amount at each position of the contour of the lung is not limited to the above-described method and may be performed by an arbitrary method. For example, a method disclosed in Patent Document I may be used.

(Step S1040: Dividing Lung Contour)

Figure 7:
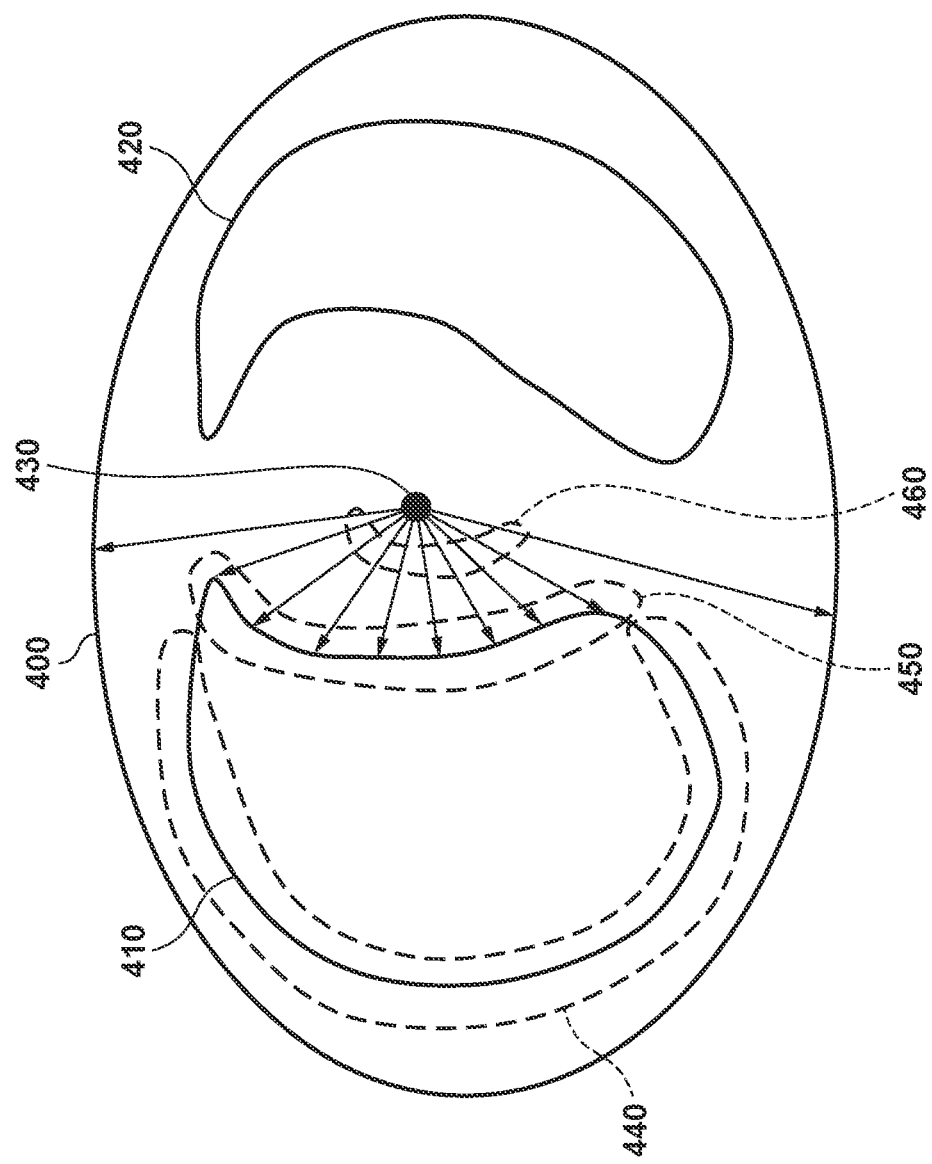
FIG. 7 is a diagram for explaining the process of step S1040 in the first embodiment in detail.

Returning to FIG. 2, in step S1040, the contour division unit 140 executes a process of dividing the lung contour into a mediastinal lung contour and a thoracic lung contour based on the lung contour L(x) extracted in step S1010. FIG. 7 illustrates a specific example.

FIG. 7 is a diagram illustrating an axial plane of an arbitrary position of the inhalation image I_ins. A body surface contour 400, a right lung contour 410, and a left lung contour 420 are visualized on this axial plane. In this process, a process of dividing the right lung contour 410, which is the target, into a mediastinal contour 450 and a thoracic contour 440 is performed. An example of specific processing will be described. First, starting from a midline position 430 of the subject, a search is performed in a direction away from the starting point in a plurality of directions as illustrated by arrows 460. Then, in each direction, a position where the arrow first intersects the right lung contour 410 is the mediastinal contour 450. At this time, if the arrow intersects the body surface contour 400 or the left lung contour 420 without intersecting the right lung contour 410, a search in that direction may be aborted.

Then, in the right lung contour 410, the positions that are not the mediastinal contour 450 are defined as the thoracic contour 440. The above process is performed in all axial planes of the inhalation image I_ins. Then, based on these results, a divided lung contour mask L'(x) is generated. More specifically, the divided lung contour mask L'(x) is a function that returns 1 at the position of the mediastinal contour 450, 2 at the position of the thoracic lung contour, and 0 at any other position. In the present embodiment, L'(x) is held as volume data that has been discretized to the same extent as 3D-CT data. Note that in the method described above, the midline position 430 does not necessarily have to be the position of the midline in the anatomical sense of the human body. For example, the center of gravity of the body surface contour 400, the midpoint between the center of gravity of the right lung contour 410 and the center of gravity of the left lung contour 420, or the like may be calculated and used as the midline position 430.

Note that the method for calculating the divided lung contour mask L'(x) is not limited to the above method. For example, configuration may be taken so as to divide the mediastinal contour 450 and the thoracic contour 440 based on the relationship between the direction of the normal of the contour at each position of the right lung contour 410 (the direction from the inside of the lung field towards the outside of the lung field) and the direction from each position towards the midline position 430. Specifically, in a case where the direction of the normal and the direction toward the midline position 430 are within a predetermined angle, that position may be the mediastinal contour 450 and others may be the thoracic contour 440. Similarly, it is possible to use any discrimination method based on geometrical differences such as the positions or the facing of the planes of the mediastinal contour and the thoracic contour.

Further, in addition, the mediastinal contour and the thoracic contour may be distinguished and then divided based on, for example, an adjacency relationship with other parts around the lungs such as the body surface contour 400 and the heart (not illustrated). More specifically, at each position of the right lung contour 410, a distance d1 from that position to the body surface contour 400 and a distance d2 from that position to the contour of the heart are calculated. Then, if d1>d2, that position may be the mediastinal contour 450, and others may be the thoracic contour 440.

In the above example, description has been given using, as an example, a case where the body surface contour 400 and the heart contour are used; however, the present invention is not limited to this, and instead of the body surface contour 400, a rib contour (not illustrated) may be used. Also, instead of the heart contour, the center of gravity of the heart region may be used.

(Step S1050: Generating Integrated Map)

In step S1050, the integrated map generation unit 150 executes a process of generating an integrated map F(x) in which the motion feature amount map M'(x) calculated in step S1020 and the slip feature amount map S'(x) calculated in step S1030 are integrated. Here, the integrated map F(x) is a map that has the values of the motion feature amount map M'(x) at the mediastinal contour positions and the values of the slip feature amount map S'(x) at the thoracic contour positions. More specifically, the integrated map F(x) is generated by the conditional substitution operation indicated in Equation (1).

[Equation 1]

$$F(x) = \begin{cases} M'(x), & \text{where } L'(x) = 1 \\ S'(x), & \text{where } L'(x) = 2 \\ \text{invalid value,} & \text{where } L'(x) = 0 \end{cases} \quad (1)$$

With the above processing, it is possible to generate a map in which a feature amount calculated for each position of the lung contour using a method suitable for that position is integrated. In particular, it is possible to generate a map that integrates the feature amounts calculated by a method that is suitable for each position in accordance with the characteristics of the image features of adjacent anatomical parts and the like based on the adjacency relationship between each position of the lung contour and anatomical parts such as other organs. Note that the method for generating integrated maps is not limited to the above method, and for example, processing in which the motion feature amount map and the slip feature amount map are smoothly integrated at a boundary position on the contour where mediastinal and thoracic sides are adjoined may be performed. Specifically, configuration may be taken so as generate an integrated map using values obtained by weighting and combining the values of both maps in accordance with the distance from the boundary position.

(Step S1060: Displaying/Storing)

In step S1060, the display control unit 160 performs control for displaying, on the display apparatus 60, the integrated map F(x) generated in step S1050. Specifically, the display control unit 160 generates an observation image for observing the integrated map F(x) and then controls so as to display, on the display apparatus 60, that image. For example, the observation image can be generated as a surface rendered image in which the integrated map F(x) has been tone-converted by grayscaling, color mapping, or the like on a three-dimensional shape of the contour of the subject's lung field. At this time, the positions where the values of the integrated map F(x) are invalid values may be rendered as transparent voxels and other positions may be rendered. Then, configuration may be taken such that the user can control conditions such as the viewpoint position, the line-of-sight direction, scaling, and gradation conversion of the rendering. For example, the input of conditions may be accepted using the operation unit 515. In addition, a volume rendering image of the inhalation image I_ins may be generated, and a surface rendering image may be superimposed on that image to generate an observation image. In addition, an arbitrary cross-sectional image may be generated from the inhalation image I_ins or 3D-CT data of an arbitrary time phase in accordance with a user's operation or the like, and the voxel values obtained by gradation-converting the integrated map F(x) by a color map or the like may be superimposed on the position of the lung contour of the cross-sectional image to generate the observation image.

Also, rather than just displaying the integrated map F(x), configuration may be taken so as to generate an observation image so as to display the motion feature amount map M'(x) calculated in step S1030 and the slip feature amount map S'(x) calculated in step S1030. In this case, configuration may be taken so as to generate an observation image so as to switch between and display any of the integrated map F(x), the motion feature amount map M'(x), and the slip feature amount map S'(x) based on a user operation. Alternatively, configuration may be taken so as to generate an observation image in which each map or portions thereof are lined up or superimposed. Incidentally, the above-described method is only an example, and an observation image may be generated in any way.

Note that, in this processing step, the information processing apparatus 10 may further store the integrated map F(x) in the examination image database 30. In this case, it is not necessary to generate or display the observation image. Similarly, the motion amount map M(x), the motion feature amount map M'(x), the slip amount map S(x), and the slip feature amount map S'(x) may be stored in the examination image database 30.

Incidentally, this information is preferably stored in association with 4D-CT data I obtained in step S1000. The information of each map to be stored in the examination image database 30 may be in a form that can be observed by an arbitrary viewer or the like after the end of the present process.

By the method described above, the processing of the information processing apparatus 10 in the present embodiment is executed. In the present embodiment, a predetermined region (e.g., a contour of the lung) of an anatomical part (e.g., the lung) is extracted from an examination image of a subject, and a first feature amount (e.g., a motion feature amount) and a second feature amount (a slip feature amount) of a predetermined region with respect to movement of that anatomical part are obtained. Further, the predetermined region is divided, and the first feature amount and the second feature amount are integrated based on the division result.

This makes it possible to acquire features using a method that is suitable for each region of an anatomical part of a subject. Therefore, it is possible to provide the user with a result (for example, an integrated map in which each feature amount map is integrated) obtained by integrating, for each part of the subject's lung contour, the analysis result of the feature calculated by a method that is suitable for that part.

(Variation 1-1: Method Other than Dividing Between Mediastinum and Thorax)

In the explanation of step S1040 of the present embodiment, description has been given using, as an example, a case where the lung contour of the subject is divided into a mediastinal contour and a thoracic contour, but the present invention is not limited thereto. For example, the lung contour may be divided into a contour of the base of the lung (the part of the lung that the diaphragm contacts) and other contours (contours other than the base of the lung). Alternatively, the lung contour may be divided into a contour of the apex of the lung (the part of the lung close to the subject's cranial side) and other contours.

Further, the present embodiment can be applied not only to the case where the lung contour is divided into two but also to the case where the lung contour is divided into three or more such as a mediastinal contour, a contour of the lung base, a contour of the lung apex, and other contours. In this case, in the process of generating the integrated map, which is performed in step S1050, it is desirable to assign and integrate a map representing the status of pleura adhesion more appropriately for each divided contour. For example, methods such as assigning a motion feature amount map to the mediastinal contour, lung base contour, and lung apex contour, while assigning a slip feature amount map to other contours may be adopted. In other words, parts at which image features are lacking outside the lung field, such as the mediastinal contour, lung base contour, and lung apex contour are assigned a motion feature amount map that can stably capture the presence/absence of adhesion even at such parts. At other parts, the slip feature amount map that can capture the presence or absence of adhesion more accurately using the characteristics of movements both inside and outside the lung field is assigned.

This makes it possible to generate a map in which feature amount calculated using a more suitable method in accordance with the characteristic of each part of their surrounding image features are integrated.

The method of dividing the lung contour is not limited to the method based on the type of anatomical part or the adjacency relationship with other neighboring parts as described above. For example, configuration may be taken so as to divide based on the reliability of registration outside the lung field, which is processed in step S10304. More specifically, configuration may be taken so as to set L'(x)=1 at a position where the reliability of registration outside the lung field at each position on the lung contour is less than a predetermined threshold and set L'(x)=2 at a position of the other contours.

Here, the reliability of the registration can be calculated, for example, based on the local similarity between the images, which is a registration result. Specifically, the similarity between the images may be L'(x)=1 at the position of the contour that is lower than the predetermined value (not similar), and L'(x)=2 at the position of the other contours. In addition, reliability can be calculated based on the presence or absence or the degree of image feature outside of the lung field (e.g., image edge, etc.) in the registration target image. Also, in a case where registration processing repeatedly involving optimization is performed, calculation can be performed based on stability or convergence of the tentative solutions in the middle of repetitive calculation. This makes it possible to generate an integrated map without using unreliable registration results, thereby enabling a more suitable integrated map to be generated.

Note that, when this method is used, depending on the registration reliability, there may be cases where the entire integrated map ends up being either a motion feature amount map or a slip feature amount map. Further, configuration may be taken so as to adaptively vary the threshold for reliability such that the size of the region to be L'(x)=1 and L'(x)=2 is a predetermined ratio.

The method of dividing the lung contour is not limited to the above method, and configuration may be taken so as to acquire a user input through the operation unit 515 such as a mouse or a keyboard (not illustrated), for example, and perform the above division based on the acquired user input. Specifically, configuration may be taken such that the shape of the lung contour extracted in step S1010 is displayed on the display apparatus 60 and the contour that is L'(x)=1 in the contour is acquired by a user's mouse operation (e.g., tracing the contour position, operating region selection, etc.).

The method of dividing the lung contour is not limited to the above method: for example, a standard lung contour model in which a mediastinal lung contour and a thoracic lung contour are distinguished may be acquired, and the contour may be divided by associating (mapping) this standard lung contour model and the contour of the subject's lung.

In this case, similarly to the standard motion amount map Rm(x) and the standard slip amount map Rs(x), the standard lung contour model can be obtained from the examination image database 30 as a process in step S1000. Similarly to the process in step S10206 or S10308, it is possible to perform association with the subject's lung contour using a correction function that causes the lung contour, lung apex position, lung base position, and the like in the standard lung contour model to coincide. According to the above method, it is possible to divide the mediastinal and thoracic lung contours in a more stable manner.

(Variation 1-2: Cases Other Than Lungs (Heart))

In the description of the present embodiment, description has been given using, as an example, the case where the subject's lung is the processing target; however the present invention is not limited thereto. For example, another anatomical part, such as the subject's heart may be a processing target. In this case, in step S1000, an image in which the subject's beating heart is captured is acquired. Specifically, a plurality of images at different phases of the heartbeat are acquired. Then, the contour of the heart between different phases and the movement of the cardiac muscles can be analyzed by multiple methods. Then, a map integrating the results analyzed by these multiple methods can be generated.

For example, a plurality of maps can be switched and integrated depending on the adjacency relationship with the lungs and the diaphragm, the positional relationship with the coronary artery, and the like. Here, the method of analyzing the contour of the heart and the movement of the cardiac muscles may include, for example, a method of generating a feature amount map that captures local expansion and contraction, a feature amount map of the speed of motion, and the like. More specifically, at the contour of the position of the coronary artery and its periphery, it is possible to calculate a feature amount map which captures the local expansion and contraction, and at the other contour, it is possible to generate a motion feature amount map. This makes it possible to generate a map by which the functional analysis of the heart and the presence or absence of adhesion between peripheral parts can be simultaneously observed.

Further, the present invention is not limited thereto and may target other organs and parts of the human body, an organ or part of an organism other than the human body, or a part of a non-living thing, or the like.

(Variation 1-3: Variation in Types of Feature Amount)

In the description of the present embodiment, description has been give using, as an example, a case where the motion feature amount map and the slip feature amount map are calculated, but the present invention is not limited thereto. For example, this embodiment can also be applied to the case of calculating maps other than those of the motion feature amount and the slip feature amount, such as local volume changes (expansion and contraction) on the lung contour or local area changes (expansion and contraction) on the contour surface. For example, the difference in whether or not a lesion near a pleura is infiltrating the exterior of the pleura may appear in the above features. In this case, different feature amount maps can be integrated on the contour near the lesion and the other contours depending on the position of the lesion on the lung contour. For example, a feature amount map can be calculated from the local volume change on the contour near the lesion position, and a map can be calculated from the motion feature amount or slip feature amount on the other contours.

This makes it possible to generate a map by which the infiltration of the lesion on the exterior of the pleura and the presence or absence of adhesion in other contours can be simultaneously observed.

In addition to the above, configuration may be taken so as to generate an integrated map by integrating a plurality of feature amounts calculated by differing the presence or absence of a comparative operation with the standard feature amount executed in step S10206 or step S10308. For example, when dividing the lung contour into the lung apex contour and other contours, an integrated map may be generated such that the lung apex contour has the value of the slip feature amount map M'(x) and the other contours have the value of slip amount map M(x). Thus, the comparison operation with the standard slip amount map for when generating the slip feature amount map can be selectively performed depending on the part.

The lung apex exemplified above has a relatively small slip amount compared to other parts, and therefore, there are the following effects. That is to say, for the lung apex, by the comparison operation with the normal case, a feature amount map in which a difference from the normal case is emphasized can be generated, and for parts other than the lung apex, a feature amount map which is closer to the physical measurement value analyzed from the input image can be generated.

In addition to the above, for example, configuration may be taken so as to execute the process in step S1030 a plurality of times by changing the execution condition; assign each result to the mediastinal contour and the thoracic contour, respectively; and generate an integrated map. As a specific example, configuration may be taken so as to, in the registration process in step S10302 or step S10304, registration is executed with the regularization condition (the condition of the degree to which the registration result is made smooth) of the registration being under different conditions from each other.

For example, registration can be performed under conditions of weak regularization (capturing differences in slip in finer details) in the lung contour near the abdomen side where the movement or slip of the lung contour caused by breathing is relatively small, the contour near the lung apex, or the mediastinal contour where the characteristic of movement or slip is relatively complex. This makes it possible to generate a map in which the result analyzed by a suitable method based on the characteristic of the movement of the part that is the analysis target is integrated.

(Variation 1-4: Variation in Display Form)

In the description of the present embodiment, description has been given using, as an example, a case where an integrated map in which the motion feature amount map and the slip feature amount map are integrated is generated as the process in step S1050 and the integrated map is displayed in step S1060, but the present invention is not limited thereto. For example, configuration may be taken so as not to generate integrated maps and, in step S1060, generate and display an observation image in which the motion feature amount map and the slip feature amount map are arranged. Alternatively, configuration may be taken so as to provide a mechanism in which the user specifies either the motion feature amount map or the slip feature amount map and an observation image is generated and displayed based on that specification.

Also, when displaying an integrated map, the display may be performed such that the result of contour division executed in step S1040 can be viewed on the integrated map. For example, a border or the like may be displayed between the mediastinal contour and thoracic contour regions. Alternatively, an observation image may be generated by changing the display form between the motion feature amount map on the mediastinal contour and the slip feature amount map of the thoracic contour. For example, the motion feature amount map on the mediastinal contour may be a color map, and the slip feature amount map of the thoracic contour may be gray scale. Alternatively, an observation image may be generated with the motion feature amount map on the mediastinal contour and the slip feature amount map of the thoracic contour as color maps with color schemes different from each other. As a result, it becomes possible not only to display in a display form that is suitable for each analysis method, but also to display an integrated map in a form in which the user can easily distinguish and recognize regions with different analysis methods.

As a form in which the user can easily distinguish regions with different analysis methods, various other methods are considered, such as a method in which an annotation is added to each region, a method of display by differing between flashing and lighting, and a method of display by varying opacity. The present embodiment can be applied even if the method is other than the above.

Second Embodiment

In the first embodiment, description has been given using, as an example, a case where the slip feature amount and the motion feature amount are calculated for the entire lung of the subject, who is an examination target, and then performing integration depending on the part of the lung; however, the present invention is not limited thereto. In the second embodiment, description will be given using, as an example, a case where the lung contour is divided before calculating the motion feature amount or the slip feature amount, and then calculating the slip feature amount or the motion feature amount for each of the divided regions.

<Configuration of Information Processing System>

Figure 8:
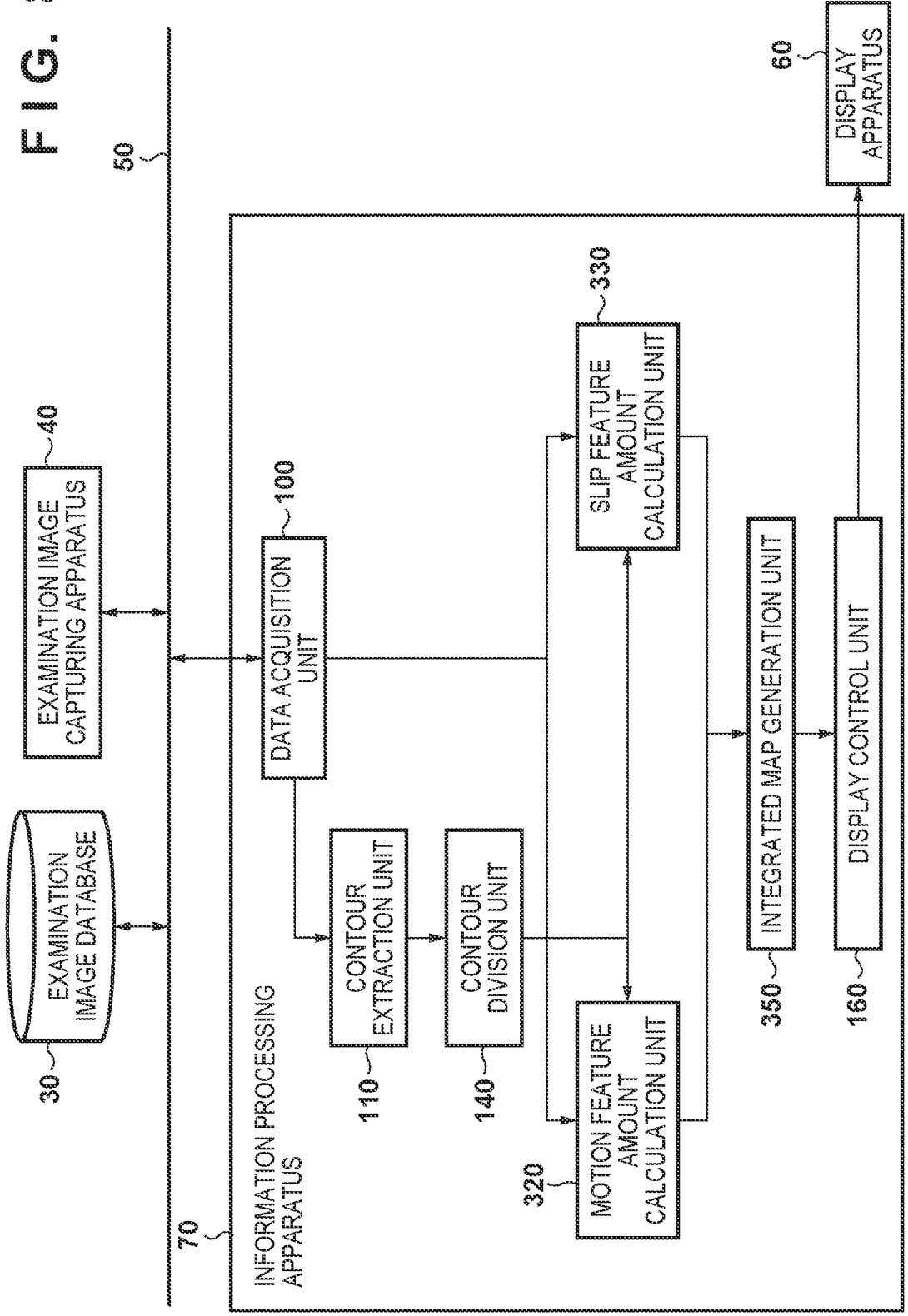
FIG. 8 is a diagram illustrating an example of a device configuration of an information processing system according to the second embodiment.

FIG. 8 is a diagram illustrating an overall configuration of an information processing system according to the present embodiment. The same reference numerals are assigned to the same elements as the components described in the overall configuration of the first embodiment, and detailed description thereof will be omitted. The information processing system includes an information processing apparatus 70, the examination image database 30, the examination image capturing apparatus 40, and the display apparatus 60, and these apparatuses are connected so as to be able to communicate with each other via a communication unit.

<Function Configuration of Information Processing Apparatus>

The information processing apparatus 70 acquires information held by the examination image database 30 via the LAN 50. The information processing apparatus 70 includes the data acquisition unit 100, the contour extraction unit 110, the contour division unit 140, a motion feature amount calculation unit 320, a slip feature amount calculation unit 330, an integrated map generation unit 350, and the display control unit 160.

The motion feature amount calculation unit 320 calculates a map of a motion feature amount in the mediastinal pleura based on the result of division by the contour division unit 140. The slip feature amount calculation unit 330 calculates a map of a slip feature amount in the thoracic pleura based on the result of division by the contour division unit 140. The integrated map generation unit 350 generates an integrated map in which the maps of the respective feature amounts that the motion feature amount calculation unit 320 and the slip feature amount calculation unit 330 calculated are integrated.

Figure 10:
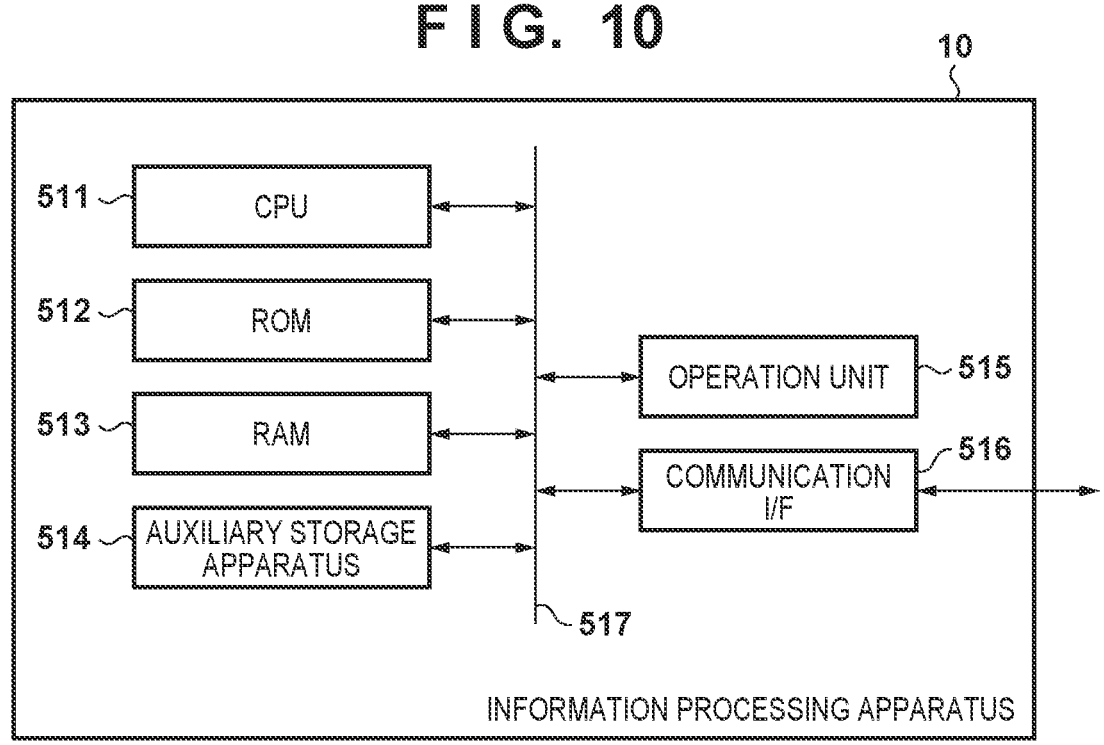
FIG. 10 is a diagram illustrating an example of a hardware configuration of an information processing apparatus according to an embodiment.

Note that the hardware configuration of the information processing apparatus 70 is the same as the configuration with reference to FIG. 10 in the first embodiment, and detailed description thereof will be omitted.

<Processing>

Figure 9:
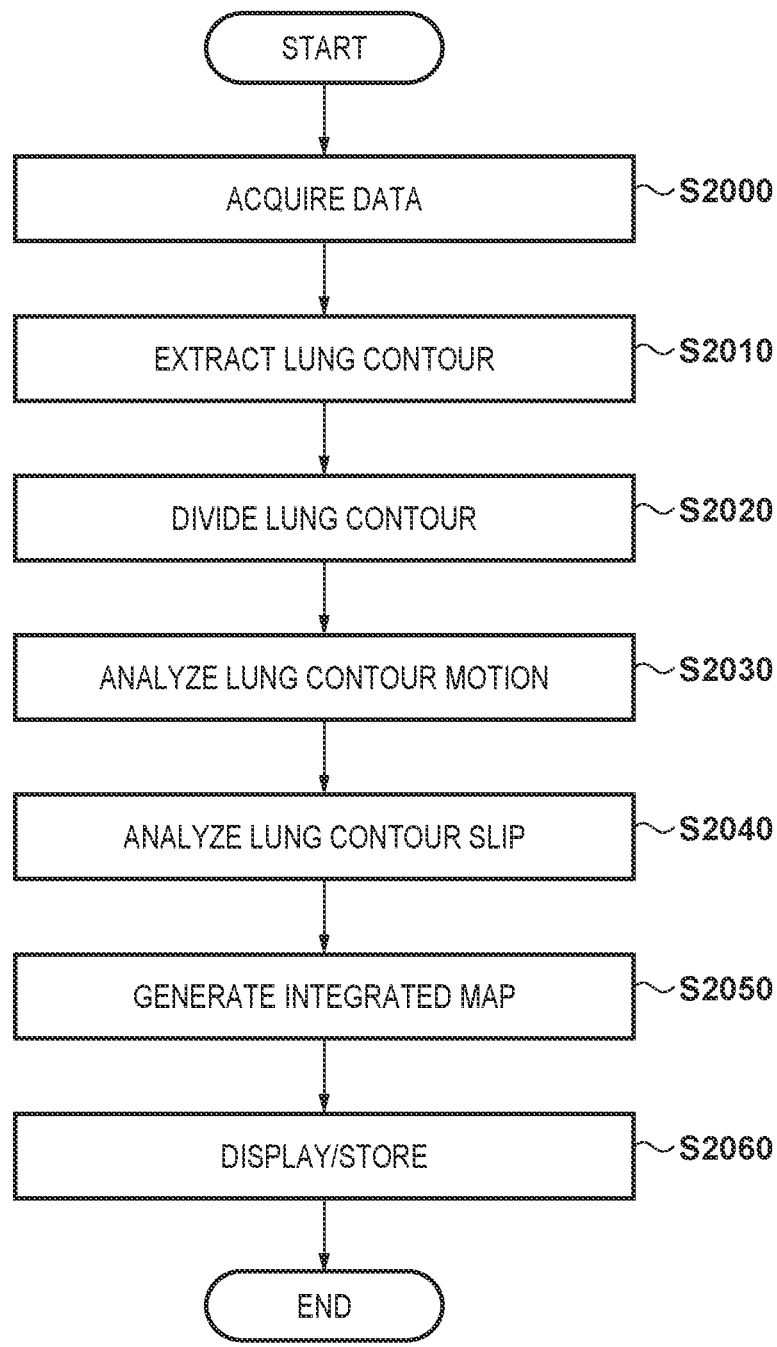
FIG. 9 is a flowchart illustrating the entire processing procedure in the second embodiment.

Next, the entire processing procedure by the information processing apparatus 70 in the present embodiment will be described in detail with reference to FIG. 9. Further, in the following, a case where CT data is used as an examination image will be described as an example, but the present invention is not limited thereto. For example, the data may be an MRI image or ultrasonic image as long as the data is three-dimensional time-series volume data in which the lungs are captured.

(Step S2000: Acquiring Data) In step S2000, the data acquisition unit 100 of the information processing apparatus 70 executes the same processing as step S1000 of the first embodiment.

Detailed description will be omitted here.

(Step S2010: Extracting Lung Contour)

In step S2010, the contour extraction unit 110 of the information processing apparatus 70 executes the same processing as step S1010 of the first embodiment. Detailed description will be omitted here.

(Step S2020: Dividing Lung Contour)

In step S2020, the contour division unit 140 of the information processing apparatus 70 executes the same processing as step S1040 of the first embodiment.

Detailed description will be omitted here.

(Step S2030: Analyzing Lung Contour Motion) In step S2030, the motion feature amount calculation unit 320 analyzes movement in the mediastinal lung contour portion of the subject by processing the 4D-CT data I and then executes processing for calculating a feature amount map M"(x) of motion caused by breathing. More specifically, the motion feature amount calculation unit 320 analyzes movement of the mediastinal lung contour calculated in step S2020, that is, the lung contour at a position where L'(x)=1, and then calculates a motion amount. This can be calculated by executing the same process as steps S10202 to S10204 of the first embodiment targeting the mediastinal lung contour. For example, calculation can be performed by performing crop (cutout) processing on the inhalation image I_ins and the exhalation image I_exp so as to include the mediastinal lung contour, and then performing processing on the cropped images.

Then, the same process as that in step S10206 of the first embodiment is performed for the mediastinal lung contour to calculate the motion feature amount map M"(x) in the mediastinal lung contour portion. Here, M"(x) is a function that returns the motion feature amount at the position x of the mediastinal lung contour and returns an invalid value for the position x of the lung contour other than the mediastinal lung contour and of those other than the lung contour. Note that this process step is similar to step S1020 of the first embodiment but differs in that the process is limited to the position of the mediastinal lung contour. However, the method for calculating the motion feature amount map, which is executed in this processing step may be the same method as step S1020 of the first embodiment.

(Step S2040: Analyzing Lung Contour Slip)

In step S2040, the slip feature amount calculation unit 330 analyzes movement in the thoracic lung contour portion of the subject by processing the 4D-CT data I and then executes processing for calculating a feature amount map S"(x) of slip caused by breathing. More specifically, the slip feature amount calculation unit 330 analyzes movement of the thoracic lung contour calculated in step S2020, that is, the lung contour at a position where L'(x)=2, and then calculates a slip amount. This can be calculated by executing the same process as in steps S10302 to S10306 of the first embodiment targeting the mediastinal lung contour. For example, calculation can be performed by performing crop (cutout) processing on the inhalation image I_ins and the exhalation image I_exp so as to include the mediastinal lung contour, and then performing processing on the cropped images.

Then, the same process as that in step S10308 of the first embodiment is performed for the thoracic lung contour to calculate the slip feature amount map S"(x) in the thoracic lung contour portion. Here, S"(x) is a function that returns the slip feature amount at the position x of the thoracic lung contour and returns an invalid value for the position x of the lung contour other than the thoracic lung contour and of those other than the lung contour. Note that this process step is similar to step S1030 of the first embodiment but differs in that the process is limited to the position of the thoracic lung contour. However, the method for calculating the slip feature amount map, which is executed in this processing step may be the same method as step S1030 of the first embodiment.

(Step S2050: Generating Integrated Map)

In step S2050, the integrated map generation unit 350 executes a process of generating an integrated map F'(x) in which the motion feature amount map M"(x) calculated in step S2030 and the slip feature amount map S"(x) calculated in step S2040 are integrated. Here, the integrated map F'(x) is a map that has the values of the motion feature amount map M"(x) at the mediastinal contour positions and the values of the slip feature amount map S"(x) at the thoracic contour positions. More specifically, the integrated map F'(x) is generated by the operation indicated in Equation (2).

[EQUATION 2]

$$F'(x) = \begin{cases} M''(x), & \text{where } L'(x) = 1 \\ S''(x), & \text{where } L'(x) = 2 \\ \text{invalid value,} & \text{where } L'(x) = 0 \end{cases} \quad (2)$$

Note that M"(x) is a function that returns an invalid value at a position other than L'(x)=1, and S"(x) is a function that returns an invalid value at a position other than L'(x)=2. Therefore, the process of substituting a value of either function that is not an invalid value in F'(x) is performed, and even if the process of substituting an invalid value to F'(x) when both functions are invalid values is performed, the same result as in Equation (2) can be obtained. The method of generating the integrated map is not limited to the above method and may be a method of smoothly integrating the two types of feature amount maps as described in step S1050 of the first embodiment.

(Step S2060: Displaying/Storing)

In step S2060, the display control unit 160 of the information processing apparatus 70 executes the same processing as step S1060 of the first embodiment. Detailed description will be omitted here. By the method described above, the processing of the information processing apparatus 70 in the present embodiment is executed.

In the present embodiment, a predetermined region (e.g., a contour of a lung) of an anatomical part (e.g., a lung) is extracted from an examination image of a subject, and a predetermined region is divided into a plurality of regions including a first region and a second region. Then, a first feature amount (e.g., a motion feature amount) in the first region and a second feature amount (slip feature amount) in the second region with respect to the movement of the anatomical part are obtained. Thereafter, the first feature amount and the second feature amount are integrated.

This makes it possible to acquire features using a method that is suitable for each region of an anatomical part of a subject. Therefore, it is possible to provide the user with a result (for example, an integrated map in which each feature amount map is integrated) obtained by integrating, for each part of the subject's lung contour, the analysis result of the feature calculated by a method that is suitable for that part. Further, as compared with the first embodiment, since each analysis process can be performed by limiting the region necessary for generating an integrated map, it is possible to obtain similar results with higher calculation efficiency.

(Variation 2-1)

The above description is only an example. For example, configuration may be taken so as not to execute the process of generating an integrated map in step S2050 and display and store, in step S2060, each map calculated in steps S2030 and S2040.

For example, similarly to step S1060 in the first embodiment, configuration may be taken so as to display each map using three-dimensional surface rendering. At this time, configuration may be taken so as to switch between and display the motion feature amount map and the slip feature amount map based on display conditions such as a viewpoint position and a line-of-sight direction, which are controlled by user operation and the like. More specifically, configuration may be taken such that in a case where a condition is such that a mediastinal contour position is displayed towards the front side from the viewpoint position and the line-of-sight direction, the motion feature amount map is displayed, and otherwise, the slip feature amount map is displayed.

This makes it possible to provide the user with a function for switching the display of each map with the operation of the viewpoint position and the line-of-sight direction and provide a mechanism by which the user can observe each feature amount map from the viewpoint position and the line-of-sight direction that is suitable for observation.
(Variation 2-2)

The above description is only an example. For example, an information processing apparatus having functions of both the first embodiment and the second embodiment may also be an embodiment. In this case, configuration may be taken so as to allow the user to select with which embodiment to perform processing or automatically select with which embodiment to perform processing based on the characteristics of an image to be analyzed or information such as the target site.

By virtue of the present invention, it becomes possible to acquire features using a method that is suitable for each region of an anatomical part of a subject.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{TM}$), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-005290, filed Jan. 15, 2021 which is hereby incorporated by reference herein in its entirety.

What is claimed is:

1. An information processing apparatus comprising:
at least one memory storing a program; and
at least one processor which, by executing the program, causes the information processing apparatus to:
extract a predetermined region of an anatomical part from an examination image of a subject;
acquire a map of a first feature amount of the predetermined region related to a movement of a contour portion of the anatomical part;
acquire a map of a second feature amount, that is different from the first feature amount, of the predetermined region related to the movement;
divide the predetermined region; and
generate an integrated map by integrating the map of the first feature amount and the map of the second feature amount based on the divided predetermined region.

2. The information processing apparatus according to claim 1, wherein the at least one processor further causes the information processing apparatus to cause a display unit to display a result of the integration.

3. The information processing apparatus according to claim 2, wherein the at least one processor further causes the information processing apparatus to render the result of the integration on a three-dimensional shape of the predetermined region of the anatomical part and then causes the display unit to display the rendered result.

4. The information processing apparatus according to claim 2, wherein the at least one processor further causes the information processing apparatus to cause the display unit to display a border between divided regions.

5. The information processing apparatus according to claim 1, wherein the at least one processor further causes the information processing apparatus to store, in a storage unit, the first feature amount, the second feature amount, and a result of the integration.

6. The information processing apparatus according to claim 1, wherein the at least one processor further causes the information processing apparatus to:
divide the predetermined region into a first region and a second region, and
perform integration, in the first region, using the first feature amount and, in the second region, using the second feature amount.

7. The information processing apparatus according to claim 6, wherein
the anatomical part is a lung, and the predetermined region is a contour of the lung,
the first feature amount is a motion feature amount indicating a motion of the contour caused by breathing, and
the second feature amount is a slip feature amount indicating a magnitude of slip of the contour caused by the breathing.

8. The information processing apparatus according to claim 7, wherein
the motion feature amount is a feature amount based on an absolute movement amount of the lung, and
the slip feature amount is a feature amount based on a relative movement amount between the lung and a part near the lung.

9. The information processing apparatus according to claim 7, wherein the first region is a mediastinal lung contour and the second region is a thoracic lung contour.

10. The information processing apparatus according to claim 7, wherein the first region is a contour of a lung base and the second region is a contour other than the lung base.

11. The information processing apparatus according to claim 7, wherein the first region is a contour of a lung apex and the second region is a contour other than the lung apex.

12. The information processing apparatus according to claim 6, wherein
the anatomical part is a heart, and the predetermined region is a contour of the heart,
the first feature amount is a feature amount indicating a motion of the contour caused by beating of the heart, and
the second feature amount is a feature amount indicating a local expansion and contraction of the contour caused by the beating of the heart.

13. The information processing apparatus according to claim 12, wherein the second region is a contour of a coronary artery and a position near the coronary artery, and the first region is a contour other than that.

14. The information processing apparatus according to claim 6, wherein
the anatomical part is a lung, and the predetermined region is a contour of the lung,
the first feature amount is a feature amount indicating a local volume change on the contour caused by breathing, and
the second feature amount is a slip feature amount indicating a magnitude of slip of the contour caused by the breathing.

15. The information processing apparatus according to claim 14, wherein the second region is a contour of the lung near a lesion position, and the first region is a contour other than that.

16. An information processing apparatus comprising:
at least one memory storing a program; and
at least one processor which, by executing the program, causes the information processing apparatus to:
extract a predetermined region of an anatomical part from an examination image of a subject;
divide the predetermined region into a first region and a second region;
acquire a map of a first feature amount in the first region related to a movement of a contour portion of the anatomical part;
acquire a map of a second feature amount in the second region, that is different from the first feature amount, related to the movement; and
generate an integrated map by integrating the map of the first feature amount and the map of the second feature amount.

17. An information processing method comprising:
extracting a predetermined region of an anatomical part from an examination image of a subject;
performing a first feature amount acquisition of acquiring a map of a first feature amount of the predetermined region related to a movement of a contour portion of the anatomical part;
performing a second feature amount acquisition of acquiring a map of a second feature amount, that is different from the first feature amount, of the predetermined region related to the movement;
dividing the predetermined region; and
generating an integrated map by integrating the map of the first feature amount and the map of the second feature amount based on the divided predetermined region.

18. An information processing method comprising:
extracting a predetermined region of an anatomical part from an examination image of a subject;
dividing the predetermined region into a first region and a second region;
performing a first feature amount acquisition of acquiring a map of a first feature amount in the first region related to a movement of a contour portion the anatomical part;
performing a second feature amount acquisition of acquiring a map of a second feature amount in the second region, that is different from the first feature amount, related to the movement; and
generating an integrated map by integrating the map of the first feature amount and the map of the second feature amount.

19. A non-transitory storage medium storing a program for causing a computer to execute an information processing method, the method comprising:
extracting a predetermined region of an anatomical part from an examination image of a subject;
performing a first feature amount acquisition of acquiring a map of a first feature amount of the predetermined region related to a movement of a contour portion of the anatomical part;
performing a second feature amount acquisition of acquiring a map of a second feature amount, that is different from the first feature amount, of the predetermined region related to the movement;
dividing the predetermined region; and
generating an integrated map by integrating the map of the first feature amount and the map of the second feature amount based on the divided predetermined region.

20. A non-transitory storage medium storing a program for causing a computer to execute an information processing method, the method comprising:
extracting a predetermined region of an anatomical part from an examination image of a subject;
dividing the predetermined region into a first region and a second region;
performing a first feature amount acquisition of acquiring a map of a first feature amount in the first region related to a movement of a contour portion of the anatomical part;
performing a second feature amount acquisition of acquiring a map of a second feature amount in the second region, that is different from the first feature amount, related to the movement; and
generating an integrated map by integrating the map of the first feature amount and the map of the second feature amount.

* * * * *